(12) United States Patent
Han et al.

(10) Patent No.: US 11,546,261 B2
(45) Date of Patent: Jan. 3, 2023

(54) CONGESTION CONTROL METHOD AND RELATED DEVICE

(71) Applicant: HUAWEI TECHNOLOGIES CO., LTD., Shenzhen (CN)

(72) Inventors: Yanfei Han, Nanjing (CN); Zhenyu Wu, Beijing (CN); Rong Yang, Shenzhen (CN); Jie Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/172,084

(22) Filed: Feb. 10, 2021

(65) Prior Publication Data

US 2021/0168076 A1 Jun. 3, 2021

Related U.S. Application Data

(63) Continuation of application No. PCT/CN2019/097031, filed on Jul. 22, 2019.

(30) Foreign Application Priority Data

Aug. 10, 2018 (CN) .................. 201810909011.X

(51) Int. Cl.
*H04L 47/12* (2022.01)
*H04L 49/50* (2022.01)
*H04L 49/20* (2022.01)

(52) U.S. Cl.
CPC .............. *H04L 47/12* (2013.01); *H04L 49/20* (2013.01); *H04L 49/50* (2013.01)

(58) Field of Classification Search
CPC ......... H04L 47/00; H04L 47/12; H04L 49/20; H04L 49/50; H04L 47/193; H04L 47/27;

(Continued)

(56) References Cited

U.S. PATENT DOCUMENTS

2004/0042412 A1 3/2004 Fan
2004/0049591 A1 3/2004 Fan et al.
(Continued)

FOREIGN PATENT DOCUMENTS

CN 1679015 A 10/2005
CN 102611620 A 7/2012
(Continued)

OTHER PUBLICATIONS

Office Action issued in CN Application No. 201810909011, dated Mar. 3, 2021, total 5 pages.
(Continued)

*Primary Examiner* — Mohamed A Kamara

(57) ABSTRACT

Embodiments of this application disclose a congestion control method and a related device. A Transmission Control Protocol offload engine TOE sends a congestion control notification to a central processing unit CPU, where the congestion control notification instructs the CPU to obtain a target parameter, and the target parameter is used by the CPU to generate a congestion control calculation result. The TOE obtains the congestion control calculation result returned by the CPU, where the congestion control calculation result includes a congestion control window value. The TOE sends a packet based on the congestion control window value. In this application, the TOE and the CPU implement congestion control together. When a new congestion control algorithm emerges, the new congestion control algorithm may be applied without changing a structure of the TOE. Therefore, in this application, an upgrade period of the congestion control algorithm can be shortened, and flexibility can be improved.

20 Claims, 5 Drawing Sheets

(58) Field of Classification Search
CPC ....... H04L 47/11; H04L 47/22; H04L 47/225; H04L 47/10; H04L 45/60
See application file for complete search history.

(56) References Cited

U.S. PATENT DOCUMENTS

| | | |
|---|---|---|
| 2004/0054814 A1 | 3/2004 | McDanial |
| 2004/0085984 A1 | 5/2004 | Elzur |
| 2004/0093411 A1 | 5/2004 | Elzur et al. |
| 2004/0153578 A1 | 8/2004 | Elzur |
| 2004/0249881 A1* | 12/2004 | Jha ............... H04L 69/166 709/200 |
| 2005/0135412 A1 | 6/2005 | Fan |
| 2007/0070906 A1 | 3/2007 | Thakur |
| 2007/0263630 A1 | 11/2007 | Fan |
| 2007/0297334 A1 | 12/2007 | Pong |
| 2008/0298369 A1 | 12/2008 | Elzur |
| 2009/0034551 A1 | 2/2009 | Elzur |
| 2009/0113069 A1* | 4/2009 | Prabhakar ........ H04L 47/10 709/235 |
| 2009/0254647 A1 | 10/2009 | Elzur et al. |
| 2010/0020693 A1 | 1/2010 | Thakur |
| 2010/0142534 A1 | 6/2010 | Elzur |
| 2010/0174831 A9 | 7/2010 | Elzur |
| 2010/0262859 A1 | 10/2010 | Fan |
| 2011/0040891 A1 | 2/2011 | Elzur et al. |
| 2011/1085076 | 7/2011 | Elzur et al. |
| 2011/0246662 A1 | 10/2011 | Elzur et al. |
| 2011/0264886 A1 | 10/2011 | Elzur |
| 2014/0254385 A1* | 9/2014 | Tabatabaee ........ H04L 43/062 370/236 |
| 2015/0043345 A1* | 2/2015 | Testicioglu ........ H04L 47/11 370/232 |
| 2017/0214775 A1 | 7/2017 | Pope et al. |
| 2018/0048581 A1* | 2/2018 | Suga ............... H04L 67/14 |

FOREIGN PATENT DOCUMENTS

| | | | |
|---|---|---|---|
| CN | 104796350 A | | 7/2015 |
| CN | 104869077 A | * | 8/2015 |
| CN | 105099938 A | | 11/2015 |
| CN | 106789708 A | | 5/2017 |
| CN | 107231315 A | | 10/2017 |
| CN | 108011834 A | | 5/2018 |
| CN | 108141779 A | | 6/2018 |
| EP | 1629656 B1 | | 12/2010 |

OTHER PUBLICATIONS

Extended European Search Reported dated Aug. 16, 2021 for Application No. 19846327.5, 13 pages.

Notice of Allowance dated Aug. 18, 2021 for Chinese Application No. 201810909011.X, 5 pages.

Search Report dated Oct. 23, 2019, issued in CN Application No. PCT/CN2019/097031, total 9 pages.

* cited by examiner

CONGESTION CONTROL METHOD AND RELATED DEVICE

CROSS-REFERENCE TO RELATED APPLICATIONS

This application is a continuation of International Application No. PCT/CN2019/097031, filed on Jul. 22, 2019, which claims priority to Chinese Patent Application No. 201810909011.X, filed on Aug. 10, 2018. The disclosures of the aforementioned applications are hereby incorporated by reference in their entireties.

TECHNICAL FIELD

This application relates to the field of computer communications, and in particular, to a congestion control method and a related device.

BACKGROUND

Currently, the internet uses a packet switching network. To prevent network congestion, a series of congestion control algorithms based on the Transmission Control Protocol (TCP) are currently proposed. Different algorithms have their own optimization features, applicable environments, and advantages and disadvantages. Currently, no congestion control algorithm is able to cover all scenarios. In addition, new congestion control algorithms are emerging.

To improve congestion control efficiency, a congestion control algorithm is configured on a Transmission Control Protocol offload engine (TOE). In other words, during packet sending, a packet sending rate is controlled based on the congestion control algorithm configured on the hardware TOE.

However, due to a long hardware development period, when a new congestion control algorithm emerges, it takes a long time to produce a hardware TOE that supports the new congestion control algorithm. Therefore, an existing congestion control solution has a long upgrade period and weak flexibility.

SUMMARY

This application provides a congestion control method and a related device, to quickly upgrade a congestion control algorithm when a new congestion control algorithm emerges, to shorten an upgrade period of the congestion control algorithm and improve flexibility.

According to a first aspect, an embodiment of this application provides a congestion control method.

After receiving an acknowledgment ACK packet, a Transmission Control Protocol offload engine TOE may send a congestion control notification to a central processing unit CPU, where the congestion control notification instructs the CPU to obtain a target parameter, and the target parameter is used by the CPU to generate a congestion control calculation result.

The TOE obtains the congestion control calculation result returned by the CPU, where the congestion control calculation result includes a congestion control window value, and the congestion control calculation result may further include a packet sending rate.

Because the congestion control calculation result includes the congestion control window value, the TOE may determine, based on the congestion control window value, a payload length for sending the packet. If the congestion control calculation result further includes the packet sending rate, the TOE may further adjust, based on the packet sending rate, a time interval of sending two adjacent packets. The TOE sends a packet based on the payload length and the time interval.

In this application, the TOE sends the congestion control notification to the CPU, and receives the congestion control calculation result generated by the CPU based on the congestion control notification, where the congestion control calculation result includes the congestion control window value. The TOE adjusts an actual length of a to-be-sent packet based on the congestion control window value. In this solution, the CPU calculates and generates the congestion control window value, in other words, a congestion control algorithm is run on software. Because the software is quickly updated, when a new congestion control algorithm emerges, the congestion control algorithm can be quickly upgraded. This improves flexibility of updating the congestion control algorithm. In addition, after obtaining the congestion control window value, the hardware TOE adjusts the actual length of the to-be-sent packet. Because a processing speed of the hardware is fast, efficiency of an entire congestion control process is improved.

Optionally, after receiving the acknowledgment ACK packet, the TOE may determine a target TCP connection to which the ACK packet belongs. Because the target parameter is a parameter required for performing congestion control calculation on the target TCP connection, the TOE obtains a target transmission control block TCB corresponding to the target TCP connection, in other words, obtains the target TCB corresponding to the target parameter. The target TCB includes a parameter generated in a process of receiving and sending packets, and the target TCB includes a first flag bit, and the first flag bit is used to indicate whether the CPU needs to participate in congestion control.

If the first flag bit indicates that the CPU needs to participate in congestion control, the TOE sends the congestion control notification to the CPU.

In this implementation, some congestion control algorithms are configured on the hardware TOE, and another congestion control algorithm is also configured on the software CPU. In this application, whether the CPU needs to participate in congestion control may be determined based on congestion control algorithms actually configured on the hardware TOE and the software CPU. In this way, waste of some congestion control algorithms that have been configured on the hardware TOE is avoided, and an optimal congestion control algorithm can be used to perform congestion calculation.

Optionally, the congestion control notification is used by the CPU to obtain a target TCB corresponding to the target parameter, and extract the target parameter from the target TCB.

In this implementation, because the congestion control algorithm is being continuously updated and upgraded, the target parameter required by the CPU to perform congestion control calculation may keep changing. In this application, a change of the target parameter does not need to be considered for the TOE, the TOE only needs to transfer an entire target TCB corresponding to the target parameter to the CPU, and the CPU obtains the required target parameters from the target TCB. This simplifies execution logic of the hardware TOE.

Optionally, that the TOE sends the congestion control notification to the central processing unit CPU includes:

because the TOE maintains the target TCB including the target parameter, the TOE sends a first POE message to the CPU after determining storage space of the target TCB, where the first POE message is used to instruct the CPU to perform congestion control calculation, the first POE message includes a first initial address of the storage space of the target TCB, and the first initial address is used by the CPU to read the target TCB, to obtain the target parameter included in the target TCB.

In this implementation, the first POE message sent to the CPU only needs to carry the first initial address of the storage space of the target TCB, and the CPU directly reads the target TCB based on the first initial address, to avoid a process in which the TOE reads the target TCB and then copies the target TCB to the first POE message, and to reduce a TOE workload.

Optionally, that the TOE sends the congestion control notification to the central processing unit CPU includes:

because the TOE maintains the target TCB including the target parameter, the TOE may read the target TCB, and send a second POE message to the CPU, where the second POE message is used to instruct the CPU to perform congestion control calculation, the second POE message carries the target TCB, and the target TCB includes the target parameter, so that the CPU obtains the target parameter from the target TCB carried in the second POE message.

In this implementation, the second POE message directly carries the target TCB. After reading the target TCB from the storage space of the target TCB, the hardware TOE directly notifies the CPU. Because a processing speed of the hardware is fast, processing efficiency of a congestion control process can be improved.

Optionally, the congestion control notification is used by the CPU to obtain only the target parameter.

In this implementation, the congestion control notification sent by the TOE is used by the CPU to obtain only the target parameter, in other words, obtain only a parameter required for performing congestion control calculation. This reduces a length of the congestion control notification, and reduces a bandwidth used by the CPU to access a memory.

Optionally, that the TOE sends the congestion control notification to the central processing unit CPU includes:

because the TOE maintains the target TCB including the target parameter, the TOE may determine, after traversing the target TCB, storage space occupied by the target parameter, and the TOE sends a third POE message to the CPU, where the third POE message is used to instruct the CPU to perform congestion control calculation, the third POE message includes a second initial address of the storage space of the target parameter, and the second initial address is used by the CPU to obtain the target parameter.

In this implementation, the second initial address of the storage space of the target parameter is sent to the CPU, and the CPU directly reads the target parameter in the memory based on the second initial address. This reduces steps of reading and copying the target parameter by the TOE, and reduces workloads of the TOE.

Optionally, that the TOE sends the congestion control notification to the central processing unit CPU includes:

because the TOE maintains the target TCB including the target parameter, the TOE may read the target parameter included in the target TCB, and the TOE may send a fourth POE message to the CPU, where the fourth POE message is used to instruct the CPU to perform congestion control calculation, and the fourth POE message carries the target parameter.

In this implementation, the fourth POE message sent to the CPU directly carries the target parameter, and the CPU may directly perform congestion control calculation after receiving the fourth POE message. This improves feasibility of this solution.

Optionally, the target TCB further includes a second flag bit and the target parameter.

If the second flag bit instructs to transfer the target TCB to the CPU, the congestion control notification includes a fifth POE message, and the fifth POE message is used by the CPU to obtain the target TCB and extract the target parameter from the target TCB.

If the second flag bit instructs to transfer only the target parameter to the CPU, the congestion control notification includes a sixth POE message, and the sixth POE message is used by the CPU to obtain only the target parameter.

In this implementation, the target TCB further includes the second flag bit. Two types of hardware logic for implementing the congestion control notification are configured on the TOE, and the two types of hardware logic may be switched by modifying the second flag bit. This improves implementation flexibility of this solution.

In this implementation, that the TOE obtains the congestion control calculation result returned by the CPU includes:

the TOE receives a seventh POE message returned by the CPU, where the seventh POE message carries the congestion control calculation result, and the TOE may directly extract the congestion control calculation result from the seventh POE message; or the TOE receives an eighth POE message returned by the CPU, where the eighth POE message is used to indicate that the congestion control calculation result has been written by the CPU into the target TCB, and because the target TCB is maintained by the TOE, after receiving the eighth POE message, the TOE may read the congestion control calculation result from the target TCB; or the TOE receives a ninth POE message returned by the CPU, where the ninth POE message includes a third initial address of a storage location of the congestion control calculation result, and the TOE reads the congestion control calculation result by using the third initial address as a start location.

This implementation provides a plurality of manners of returning the congestion control calculation result. This improves implementation feasibility of this solution and enhances flexibility of this solution.

Optionally, the TOE and the CPU may share a first cache space. Because the TOE maintains the target TCB, the TOE may write the target TCB into the first cache space.

That the TOE sends the congestion control notification to the central processing unit CPU includes: the TOE may send a first notification to the CPU, where the first notification is used to instruct the CPU to perform congestion control calculation, so that the CPU reads the target TCB from the first cache space, and the first notification may be a special type of electrical signal.

That the TOE receives the congestion control calculation result returned by the CPU includes: the TOE and the CPU may share a second cache space, where the second cache space stores the congestion control calculation result, and after receiving a second notification returned by the CPU, the TOE may learn that the congestion control calculation result needs to be read, and read the congestion control calculation result from the second cache space.

In this implementation, the TOE and the CPU share the cache space. After writing the target TCB into the first cache space, the TOE needs to send only the first notification of reading the target TCB to the CPU, and the CPU may actively read the target TCB from the first cache space. After receiving the second notification of reading the congestion control calculation result, the TOE may actively read the congestion control calculation result from the second cache space. This provides more interaction manners between the TOE and the CPU, and improves implementation flexibility of this solution.

Optionally, the TOE and the CPU may share a third cache space. Because the TOE maintains the target TCB, the TOE may read the target parameter from the target TCB, and write the target parameter into the third cache space.

That the TOE sends the congestion control notification to the central processing unit CPU includes: the TOE sends a third notification to the CPU, where the third notification is used to instruct the CPU to perform congestion control calculation, so that the CPU reads the target parameter from the third cache space, and the third notification may be a special type of electrical signal.

That the TOE receives the congestion control calculation result returned by the CPU includes: the TOE and the CPU may share a second cache space, where the second cache space stores the congestion control calculation result, and after receiving a second notification returned by the CPU, the TOE may learn that the congestion control calculation result needs to be read, and read the congestion control calculation result from the second cache space.

In this implementation, the TOE and the CPU share the cache space. After writing the target TCB into the first cache space, the TOE needs to send only the first notification of reading the target parameter to the CPU, and the CPU may actively read the target parameter from the first cache space. After receiving the second notification of reading the congestion control calculation result, the TOE may actively read the congestion control calculation result from the second cache space. This provides more interaction manners between the TOE and the CPU, and improves implementation flexibility of this solution.

According to a second aspect, an embodiment of this application provides a Transmission Control Protocol offload engine. The Transmission Control Protocol offload engine performs the method according to the first aspect, and the Transmission Control Protocol offload engine includes:

a processor, a memory, a first interface, and a second interface.

The processor is configured to send a congestion control notification to a central processing unit CPU by using the first interface, where the congestion control notification instructs the CPU to obtain a target parameter, and the target parameter is used by the CPU to generate a congestion control calculation result.

The processor is configured to obtain, by using the first interface, the congestion control calculation result returned by the CPU, where the congestion control calculation result includes a congestion control window value.

The memory is configured to store the congestion control window value.

The processor is configured to send a packet by using the second interface based on the congestion control window value stored in the memory.

In this application, the TOE sends the congestion control notification to the CPU by using the first interface, to instruct the CPU to obtain the target parameter required for performing congestion control calculation, and receives, by using the first interface, the congestion control calculation result generated by the CPU based on the target parameter. The congestion control calculation result includes at least the congestion control window value. The processor adjusts an actual length of a to-be-sent packet based on the congestion control window value stored in the memory. In this solution, the CPU calculates and generates the congestion control window value, in other words, a congestion control algorithm is run on software. Because the software is quickly updated, when a new congestion control algorithm emerges, the congestion control algorithm can be quickly upgraded. This improves flexibility of updating the congestion control algorithm. In addition, after obtaining the congestion control window value, the hardware TOE adjusts the actual length of the to-be-sent packet. Because a processing speed of the hardware is fast, efficiency of an entire congestion control process is improved.

For the congestion control notification in the second aspect of this application, refer to the first aspect.

According to a third aspect, an embodiment of this application provides a congestion control system. The system includes a Transmission Control Protocol offload engine TOE and a central processing unit CPU, and the TOE is the TOE in any implementation of the first aspect.

The CPU is configured to: receive a congestion control notification sent by the TOE, obtain a target parameter based on the congestion control notification, generate a congestion control calculation result based on the target parameter, and send the congestion control calculation result to the TOE. The congestion control calculation result includes a congestion control window value, and the congestion control window value is used by the TOE to send a packet.

According to a fourth aspect, an embodiment of this application provides a computer-readable storage medium. The computer-readable storage medium stores a congestion control instruction. When the instruction is run on a computer, the computer is enabled to perform the method according to the first aspect.

According to a fifth aspect, an embodiment of this application provides a chip system. The chip system includes a processor, configured to support a network device in implementing functions in the foregoing aspects, for example, sending or processing data and/or information in the foregoing methods. In a possible design, the chip system further includes a memory. The memory is configured to store a program instruction and data that are necessary for a network device. The chip system may include a chip, or may include a chip and another discrete component.

For beneficial effects of the second aspect to the fifth aspect of this application, refer to the first aspect.

DESCRIPTION OF EMBODIMENTS

Embodiments of this application provide a congestion control method and a related device, to quickly upgrade a congestion control algorithm when a new congestion control algorithm emerges, to shorten an upgrade period of the congestion control algorithm and improve flexibility.

Figure 1:
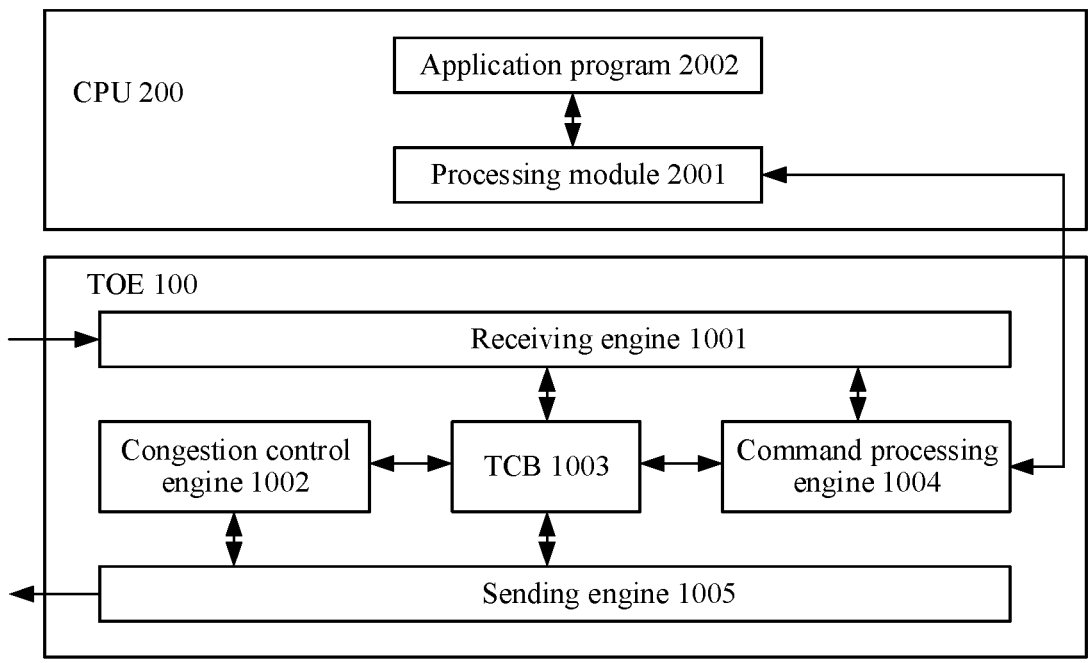
FIG. 1 is a schematic structural diagram of a system according to an embodiment of this application.

In this embodiment of this application, referring to FIG. 1, a system is provided. The system includes a CPU 200 and a TOE 100. All or some functions of a TCP/IP protocol stack are offloaded to the dedicated hardware TOE 100, so that the TOE 100 processes a TCP packet. This reduces a processing load of the CPU 200. The TOE 100 is responsible for checksum calculation, TCP packet decapsulation, TCP packet encapsulation, out-of-order packet reassembly, congestion control calculation, and the like. The CPU receives only load of a processed TCP packet.

In this embodiment of this application, the TOE 100 includes a receiving engine 1001, a congestion control engine 1002, a transmission control block (TCB) 1003, a command processing engine 1004, and a sending engine 1005.

After receiving the TCP packet, the receiving engine 1001 is responsible for parsing the TCP packet, calculating, verifying, reassembling an out-of-order packet, and the like, and writing a parameter generated in a process of receiving the packet into the TCB 1003.

The command processing engine 1004 is responsible for exchanging information with the CPU 200. After the receiving engine 1001 parses packet load of the TCP packet, the command processing engine 1004 uploads the packet load to the CPU 200, and updates the TCB 1003 based on an instruction delivered by the CPU 200.

Because each TCP packet belongs to a TCP connection, the TCB 1003 may maintain one TCB for each TCP connection, and each TCB is used to record a parameter generated in processes of receiving and sending packets by using a TCP connection.

After the congestion control engine 1002 adjusts a length of a to-be-sent TCP packet based on the parameter in the TCB 1003, the sending engine 1005 packetizes and sends the TCP packet.

In this embodiment of this application, a processing module 2001 and an application program 2002 run on the CPU 200. The processing module 2001 is configured to exchange a message with the TOE 100, and transfer the received TCP packet load to the application program 2002.

Figure 2:
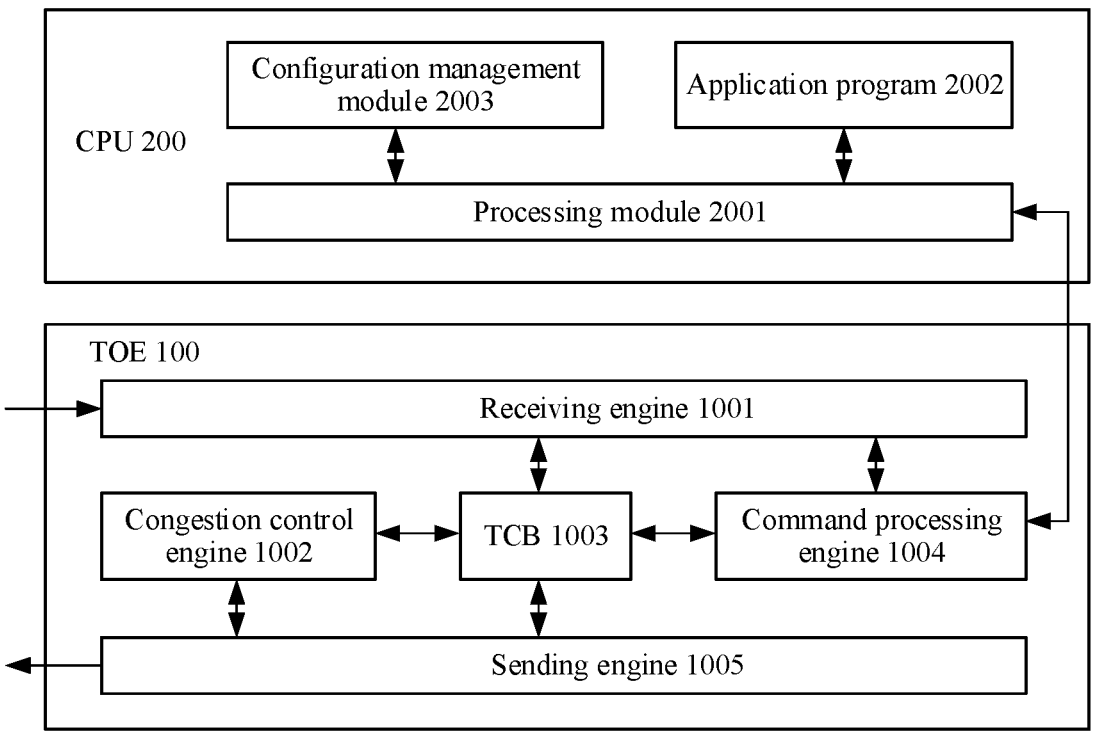
FIG. 2 is a schematic structural diagram of another system according to an embodiment of this application.

Referring to FIG. 2, the CPU 200 further includes a configuration management module 2003. The command processing engine 1004 sends, to the processing module 2001, a congestion control notification used to instruct the CPU to perform congestion control calculation. The configuration management module 2003 performs congestion control calculation by using a congestion control algorithm configured on the CPU, and returns a congestion control calculation result to the TOE 100 by using the processing module 2001. The congestion control calculation result includes at least a congestion control window value. The congestion control engine 1002 sends a packet based on the congestion control window value.

In this embodiment of this application, because the TOE maintains a corresponding TCB for each TCP connection, the congestion control notification sent by the TOE to the CPU may be used by the CPU to obtain only a target parameter required for performing the congestion control calculation, or may be used by the CPU to obtain an entire target TCB including the target parameter.

In this embodiment of this application, a type of the congestion control notification sent to the CPU may be preset in the TOE, for example, the congestion control notification is used by the CPU to obtain the target TCB, or is used by the CPU to obtain only the target parameter. Alternatively, a target flag bit indicating a type of the congestion control notification may be set in the TCB, so that before sending the congestion control notification to the CPU, the TOE may read the target flag bit in the target TCB, and determine the type of the congestion control notification based on an indication of the target flag bit. The following separately describes the foregoing three cases.

1. The congestion control notification is used by the CPU to obtain the target TCB.

Figure 3:
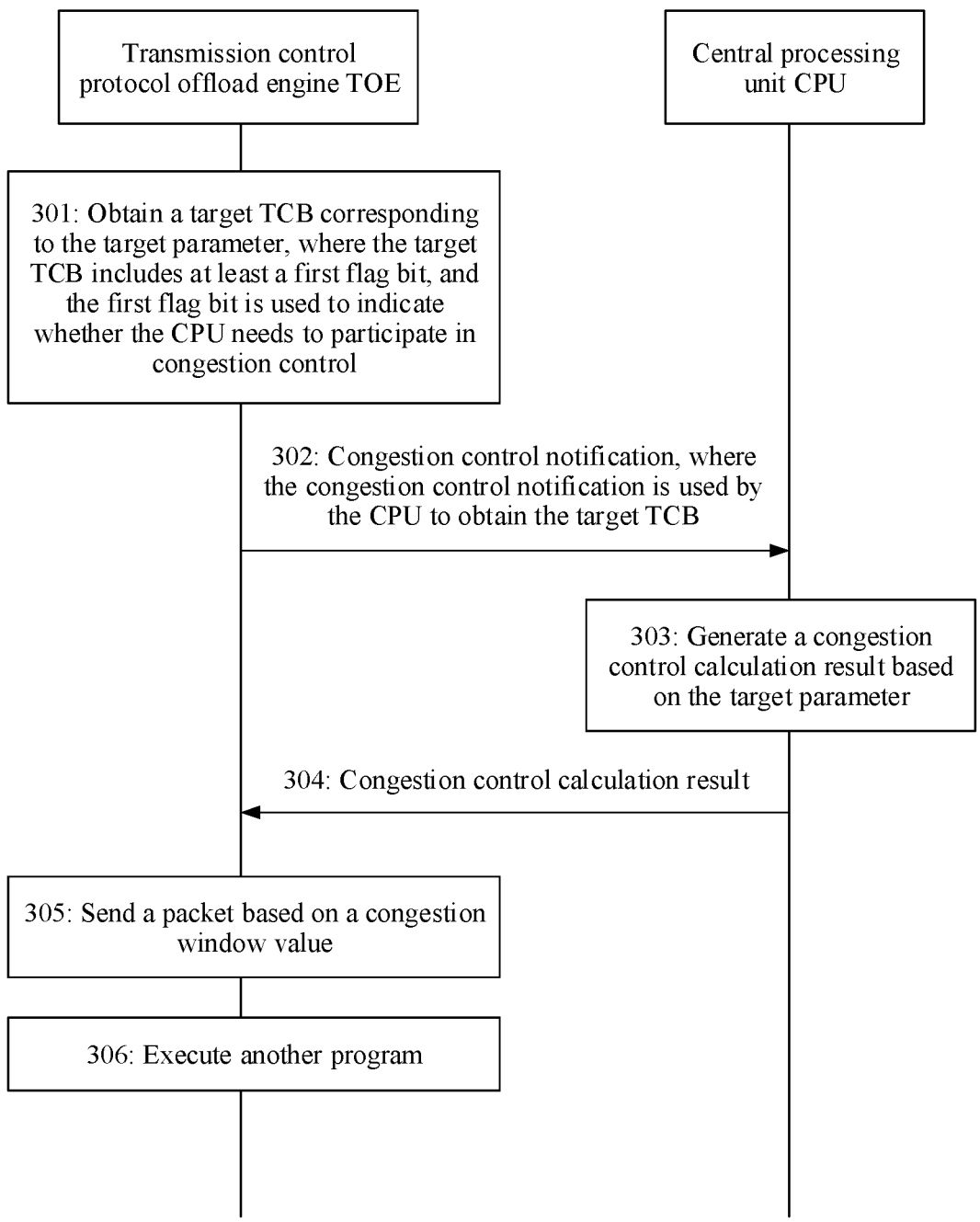
FIG. 3 is a schematic flowchart of a congestion control method according to an embodiment of this application.

Specifically, referring to FIG. 3, in an embodiment of this application, an embodiment of a congestion control method may include steps 301 to 306.

301: A TOE obtains a target TCB corresponding to the target parameter, where the target TCB includes at least a first flag bit, and the first flag bit is used to indicate whether the CPU needs to participate in congestion control.

In this embodiment, after receiving an acknowledgment (ACK) packet, the TOE may determine a target TCP connection to which the ACK packet belongs, and further obtain the target TCB corresponding to the target TCP connection, where the target TCB includes the target parameter, in other words, obtain the target TCB corresponding to the target parameter. The target TCB may include the first flag bit, and the first flag bit is used to indicate whether the CPU needs to participate in congestion control. If the first flag bit indicates that the CPU needs to participate in congestion control, step 302 is performed. If the first flag bit indicates that the CPU does not need to participate in congestion control, step 306 is performed.

In this embodiment and following embodiments, the target TCB includes parameters generated in processes of receiving and sending a packet by using the target TCP connection, and may include a status of the target TCP connection, round-trip time (RTT) of a target TCP packet, and a retransmission timeout (RTO) period of the target TCP packet, a quantity of ACK packets, a congestion control status, a congestion control window value, a packet sending rate, or another parameter generated in a process of executing the TCP protocol.

The target TCB may be stored in a form of an array, a table, or in another form. This is not specifically limited herein.

In this embodiment and following embodiments, because the target TCP connection may be established by the CPU, when establishing the target TCP connection, the CPU may create a target TCB used to record the target TCP connection, and deliver an index value of the target TCB and the TCB to the TOE by using the processing module 2001, and the TOE maintains the target TCB. Alternatively, the target TCP connection may be established by the TOE, when establishing the target TCP connection, the TOE may create a target TCB used to record the target TCP connection, and maintain the target TCB.

In this embodiment and following embodiments, the target parameter is a parameter required for performing congestion control calculation on the target TCP connection. The target parameter may include RTT, a congestion control status, a quantity of ACK packets, or the like. For example, when the congestion control algorithm is a slow restart algorithm, the required target parameters include a slow start window threshold, the quantity of ACK packets, and the congestion control status. In another example, when the congestion control algorithm is a cubic algorithm, the required target parameters include a slow start window threshold, RTT obtained after smooth calculation, a congestion window value when an ACK packet is received last time, a time point of updating the congestion window value when the ACK packet is received last time, a congestion control status, a quantity of ACK packets, and the like. It should be understood that, because the congestion control algorithm is continuously updated and upgraded, the parameter required for performing congestion control calculation may be continuously changed. A specific value of the target parameter should be set based on an actually used congestion control algorithm. This is not limited herein.

In this embodiment, when there is different information in the first flag bit, the different information is separately used to indicate whether the CPU needs to participate in congestion control. To be specific, when there is first information in the first flag bit, the first flag bit indicates that the CPU needs to participate in congestion control. When there is second information in the first flag bit, the first flag bit indicates that the CPU does not need to participate in congestion control. For example, when there is 1 in the first flag bit, the first flag bit indicates that the CPU needs to participate in congestion control, and when there is 0 in the first flag bit, the first flag bit indicates that the CPU does not need to participate in congestion control. It should be understood that the example herein is merely used for ease of understanding of this solution, and the information in the first flag bit is not limited.

In this embodiment, some congestion control algorithms are configured on the hardware TOE, and another congestion control algorithm is also configured on the software CPU. After the target TCP connection is successfully established, the CPU may obtain a capability of the congestion control algorithm configured on the hardware TOE, and may identify whether the congestion control algorithm configured on the hardware TOE can support this congestion control calculation. If the congestion control algorithm cannot support this congestion control calculation, the CPU needs to participate in congestion control, and the first information may be added in the first flag bit. If the congestion control algorithm can support this congestion control calculation, the CPU does not need to participate in congestion control, and the second information may be added in the first flag bit. In this application, whether the CPU needs to participate in congestion control may be determined based on congestion control algorithms actually configured on the hardware TOE and the software CPU. In this way, waste of some congestion control algorithms that have been configured on the hardware TOE is avoided, and an optimal congestion control algorithm can be used to perform congestion calculation

302: The TOE sends a congestion control notification to the CPU, where the congestion control notification is used by the CPU to obtain the target TCB.

In this embodiment, after the TOE determines, based on the obtained target TCB, that the CPU needs to participate in congestion control, the TOE may send the congestion control notification to the CPU, where the congestion control notification is used by the CPU to obtain the target TCB. In an implementation, the TOE may assist the CPU in obtaining the target TCB by sending a message to the CPU. In another implementation, a shared first cache space is set for the TOE and the CPU. After writing the target TCB into the first cache space, the TOE sends, to the CPU, a notification used to instruct the CPU to perform congestion control calculation, so that the CPU reads the target TCB from the first cache space.

In this embodiment, the congestion control notification sent by the TOE to the CPU may be a packet order enforcer (POE) message, or may be another type of message.

The POE message is a message type for implementing message communication between hardware and software, and the POE message may include a message header and a message body. In this embodiment and following embodiments, an example in which the message sent by the TOE to the CPU is the POE message is used for description.

In this embodiment and following embodiments, the first cache space shared by the TOE and the CPU may be in a form of a linked list, or may be in a form of a queue, or may be in another data storage form, or the like. A specific presentation form of the first cache space shared by the TOE and the CPU is not limited herein. The following separately describes a case in which the TOE sends the congestion control notification to the CPU.

1. The TOE sends a POE message to the CPU.

In this embodiment, the TOE may send a first POE message to the CPU, where the first POE message may include a first initial address of storage space of the target TCB. After obtaining the first POE message, the CPU reads the target TCB based on the first initial address of the storage space of the target TCB, and determines the target parameter from the read target TCB. The first POE message sent to the CPU only needs to carry the first initial address of the storage space of the target TCB, and the CPU directly reads the target TCB based on the first initial address, to avoid a process in which the TOE reads the target TCB and then copies the target TCB to the first POE message, and to reduce a TOE workload.

In this embodiment, the first POE message includes a message header and a message body. Content included in the message header of the first POE message is described below with reference to Table 1. It should be understood that the message header of the first POE message further includes another field, for example, a length of the message body, a group number bound to the message, or content of another field. Only fields related to this application are described herein.

TABLE 1

| Field | Value |
|---|---|
| User-defined | Index value of the target TCB |
| Message type | 1 |
| Initial address | First initial address of the storage space of the target TCB |

In this embodiment, referring to Table 1, a value of the user-defined field of the first POE message is the index value of the target TCB, and the index value of the target TCB is used to indicate a correspondence between the TCB and a TCP connection. The value of the message type field is 1, and 1 is used to indicate that the CPU needs to participate in congestion control. The initial address field is used to indicate the first initial address of the storage space of the target TCB. Because the POE message may support a plurality of message types, a relationship between different message types and values may be flexibly set based on an actual situation.

It should be understood that the message header of the first POE message is explained herein only with reference to a table, and the first POE message specifically does not exist in a form of a table.

In this embodiment, the TOE may further send a second POE message to the CPU, where a message body of the second POE message may directly carry the target TCB, and the target TCB includes the target parameter. The CPU receives and reads the second POE message, obtains the target parameter from the target TCB carried in the second POE message. The second POE message directly carries the target TCB. After reading the target TCB from the storage space of the target TCB, the hardware TOE directly notifies the CPU. Because a processing speed of the hardware is fast, processing efficiency of a congestion control process can be improved.

2. The TOE and the CPU share the first cache space.

In this embodiment, because the TOE and the CPU share the first cache space, the TOE writes the target TCB into the first cache space in advance. When the TOE sends a first notification to the CPU, where the first notification is used to instruct the CPU to perform congestion control calculation, the CPU may read the target TCB from the first cache space. The first notification may be an electrical signal. For example, when the TOE sends a high-level electrical signal to the CPU, it indicates that the CPU is instructed to perform congestion control calculation, and the CPU reads the target TCB from the first cache space. In another example, the first notification may alternatively be a low-level electrical signal. A specific representation form of the first notification is not limited herein.

In this embodiment, the first cache space stores a plurality of first cache entries, and each first cache entry may include an index value of the target TCB and a target TCB. When reading the target TCB from the first cache space, the CPU may also obtain the index value of the target TCB at the same time, to determine a correspondence between the TCB and the TCP connection.

It should be understood that the TOE may further transfer the target TCB to the CPU in another manner. Details are not described herein.

In this embodiment, because the congestion control algorithm is being continuously updated and upgraded, the target parameter required by the CPU to perform congestion control calculation may keep changing. In this application, a change of the target parameter does not need to be considered for the TOE, the TOE only needs to transfer an entire target TCB corresponding to the target parameter to the CPU, and the CPU obtains the required target parameters from the target TCB. This simplifies execution logic of the hardware TOE.

303: The CPU generates a congestion control calculation result based on the target parameter.

In this embodiment, after obtaining the target TCB based on the received congestion control notification, the CPU obtains the required target parameter from the target TCB with reference to the congestion control algorithm used by the CPU, and performs congestion control calculation, to generate the congestion control calculation result.

304: The TOE obtains the congestion control calculation result returned by the CPU.

In this embodiment, after obtaining the target TCB, the CPU obtains the target parameter from the target TCB, performs congestion control calculation, and returns the congestion control calculation result to the TOE.

In this embodiment, the congestion control calculation result includes at least a congestion control window value, and may further include a packet sending rate, another parameter required when the TOE sends a packet, or the like. Different congestion control algorithms may obtain different congestion control calculation results, specific contents included in the congestion control calculation result should be flexibly set according to an actual congestion control algorithm.

In this embodiment, a manner in which the TOE obtains the congestion control calculation result returned by the CPU may be receiving the POE message returned by the CPU. Alternatively, the TOE and the CPU may share the second cache space, and after receiving the second notification returned by the CPU, the TOE reads the congestion control calculation result from the second cache space. The following separately describes the foregoing two manners of obtaining the congestion control calculation result.

(1) The TOE obtains the POE message returned by the CPU.

In this embodiment, the TOE may receive a seventh POE message returned by the CPU, where a message body of the seventh POE message carries the congestion control calculation result, and after receiving the seventh POE message, the TOE may read the congestion control calculation result from the seventh POE message.

In this embodiment, the TOE may alternatively receive an eighth POE message returned by the CPU, where the eighth POE message is used to indicate that the congestion control calculation result has been written by the CPU into the target TCB, and after receiving the eighth POE message, the TOE may read the congestion control calculation result from the target TCB.

In this embodiment, the TOE may alternatively receive a ninth POE message returned by the CPU, where the ninth POE message includes a third initial address of a storage location of the congestion control calculation result, and after receiving the ninth POE message, the TOE may read the congestion control calculation result by using the third initial address as a start location.

(2) The TOE and the CPU share the second cache space.

In this embodiment, because the TOE and the CPU share the second cache space, after the CPU writes the congestion control calculation result into the second cache space, the TOE may receive the second notification returned by the CPU, where the second notification is used to instruct to read the congestion control calculation result, and the TOE may read the congestion control calculation result from the second cache space. The second notification may be an electrical signal. For example, when the TOE receives a high-level electrical signal sent by the CPU, it indicates that the TOE needs to read the congestion control calculation result, and the TOE reads the congestion control calculation result from the second cache space. In another example, the second notification may alternatively be a low-level electrical signal. A specific representation form of the second notification is not limited herein.

In this embodiment, the second cache space stores a plurality of second cache entries, and each second cache entry may include an index value of the target TCB and a congestion control calculation result. When reading the congestion control calculation result from the second cache space, the TOE may also obtain a congestion control calculation result corresponding to the target TCB at the same time, to determine a correspondence between the congestion control calculation result and the TCP connection.

In this embodiment, a plurality of manners of returning the congestion control calculation result are provided. This improves implementation possibility of this solution and enhances flexibility of this solution.

305: The TOE sends a packet based on the congestion control window value.

In this embodiment, because the congestion control calculation result includes the congestion control window value, when sending the packet, the TOE may compare a length of the to-be-sent packet with the obtained congestion control window value. If the length of the to-be-sent packet is greater than the congestion control window value, the TOE adjusts a payload length of the to-be-sent packet, so that the packet is sent after the length of the to-be-sent packet is equal to the congestion control window value; and if the length of the to-be-sent packet is less than the congestion control window value, the packet is directly sent.

In this embodiment, when the congestion control calculation result further includes the packet sending rate, after determining the payload length of the to-be-sent packet, the TOE adjusts, based on the packet sending rate, a time interval of sending two adjacent packets.

306: The TOE executes another program.

2. The congestion control notification is used by the CPU to obtain only the target parameter.

Figure 4:
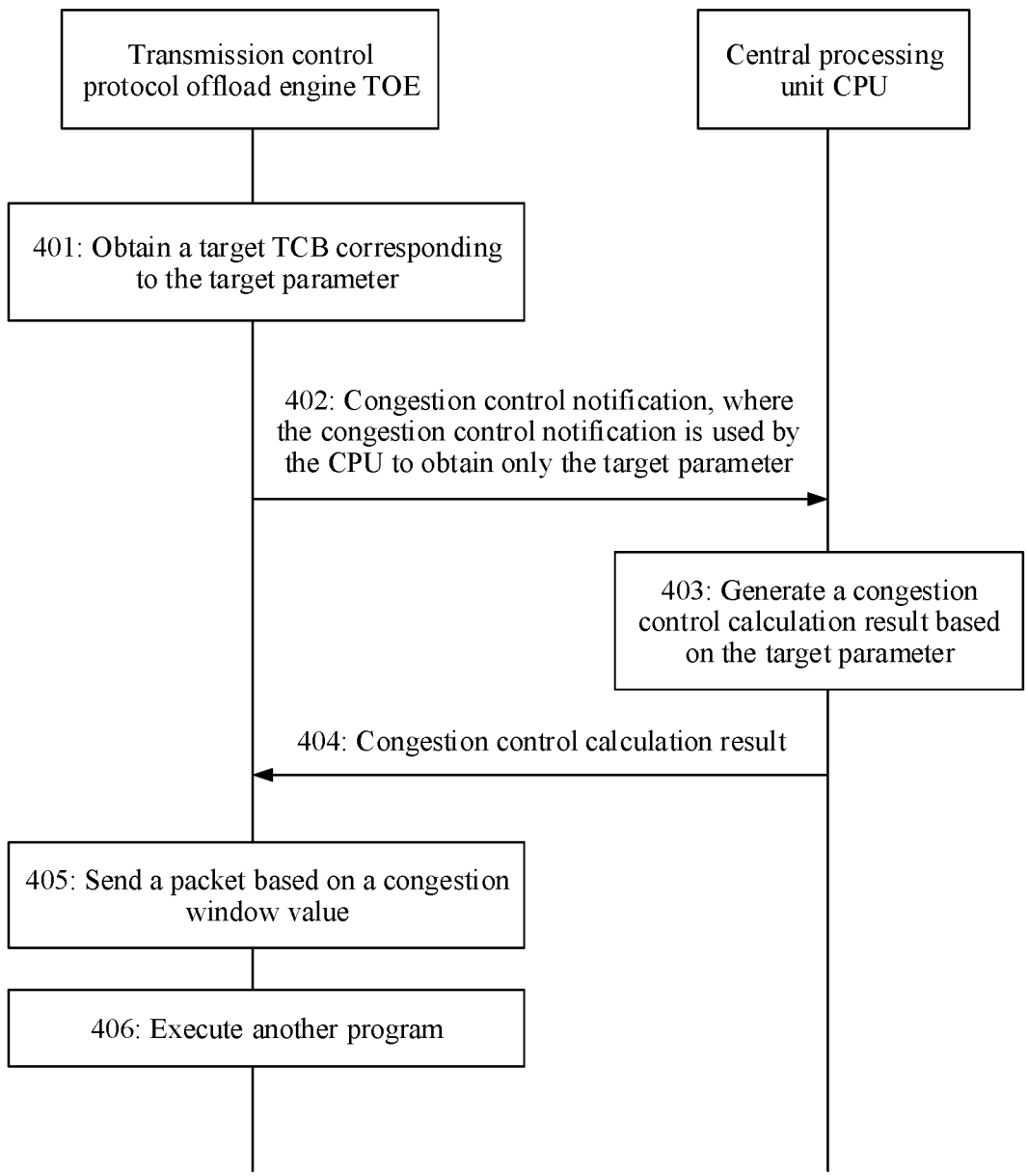
FIG. 4 is another schematic flowchart of a congestion control method according to an embodiment of this application.

Specifically, referring to FIG. 4, in an embodiment of this application, another embodiment of the congestion control method may include steps 401 to 406.

401: Obtain a target TCB corresponding to a target parameter.

In this embodiment, step 401 is similar to step 301 in the embodiment in FIG. 3. Details are not described herein again.

402: The TOE sends the congestion control notification to the CPU, where the congestion control notification is used by the CPU to obtain only the target parameter.

In this embodiment, after the TOE determines that the CPU needs to participate in congestion control, the TOE may assist the CPU in obtaining the target parameter by sending a POE message to the CPU. Alternatively, the TOE and the CPU may share third cache space, after writing the target parameter into the third cache space, the TOE sends, to the CPU, a notification used to instruct the CPU to perform congestion control calculation, so that the CPU reads the target parameter from the third cache space. The following separately describes a case in which the TOE sends the congestion control notification to the CPU.

A. The TOE sends the POE message to the CPU.

In an implementation, the TOE may send a third POE message to the CPU, where the third POE message includes a second initial address of storage space of the target parameter. After receiving the third POE message, the CPU may read the target parameter by using the second initial address as a start location.

In another implementation, the TOE may further send a fourth POE message to the CPU, where the fourth POE message carries the target parameter. After receiving the fourth POE message, the CPU reads the target parameter carried in the fourth POE message.

B. The TOE and the CPU share the third cache space.

In this embodiment, because the TOE and the CPU share the third cache space, the TOE writes the target parameter into the third cache space in advance. When the TOE sends, to the CPU, the third notification used to instruct the CPU to perform congestion control calculation, the CPU may read the target parameter from the third cache space.

In this embodiment, the third cache space stores a plurality of third cache entries, and each third cache entry may include an index value of the target TCB and a target parameter. When reading the target parameter from the third cache space, the CPU may also obtain the index value of the target TCB at the same time, to determine a correspondence between the target parameter and the TCP connection.

It should be understood that the TOE may further transfer the target parameter to the CPU in another manner. Details are not described herein.

In this embodiment, the congestion control notification sent by the TOE is used by the CPU to obtain only the target parameter, in other words, obtain only a parameter required for performing congestion control calculation. This reduces a length of the congestion control notification, and reduces a bandwidth used by the CPU to access a memory.

403: The CPU generates a congestion control calculation result based on the target parameter.

404: The TOE obtains the congestion control calculation result returned by the CPU.

405: The TOE sends a packet based on the congestion control window value.

406: The TOE executes another program.

In this embodiment, steps 403 to 406 are similar to steps 303 and 306 in the embodiment in FIG. 3. Details are not described herein again.

3. Determine a type of the congestion control notification based on a flag bit included in the target TCB.

Figure 5:
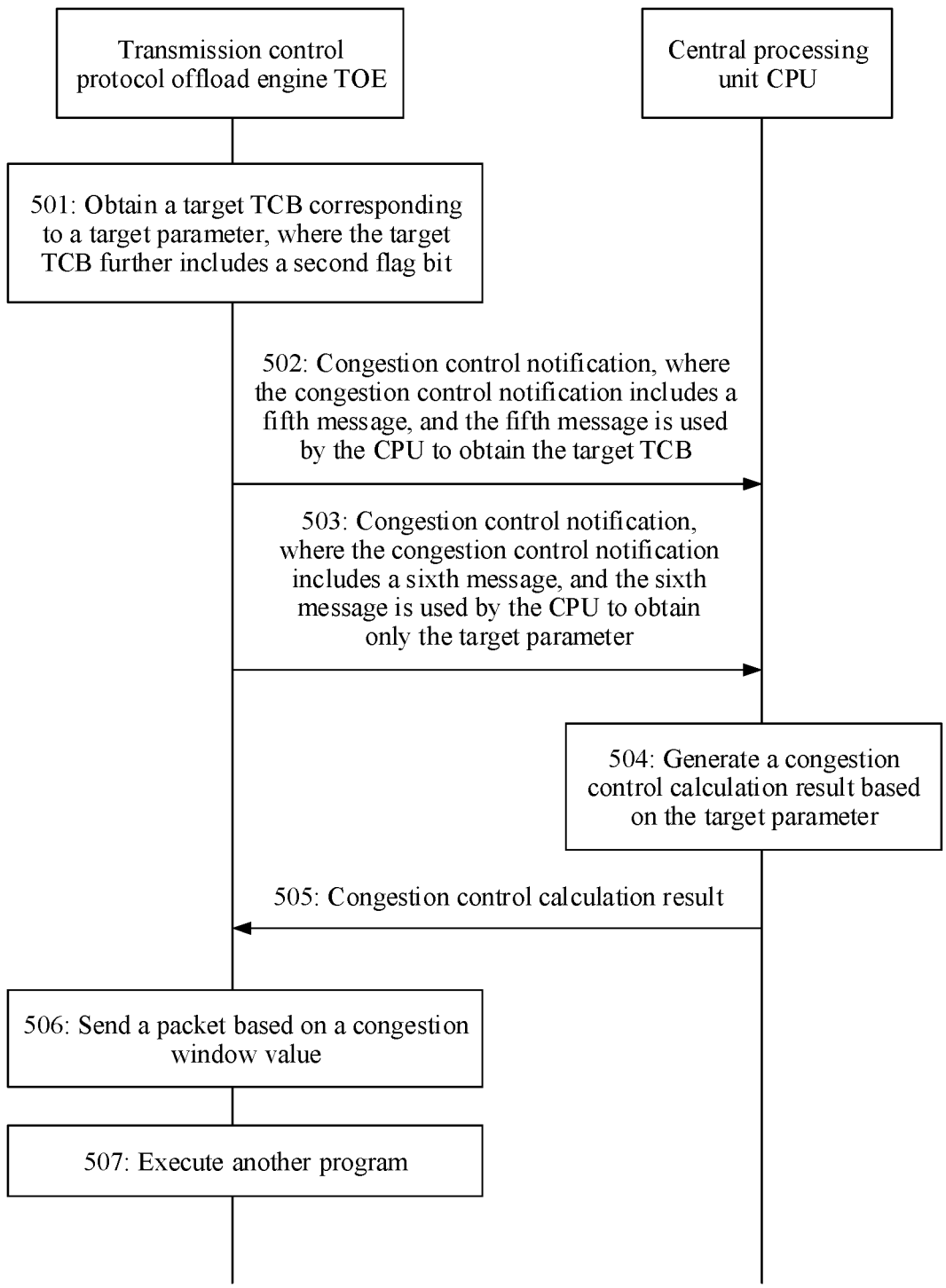
FIG. 5 is still another schematic flowchart of a congestion control method according to an embodiment of this application.

Specifically, referring to FIG. 5, in an embodiment of this application, another embodiment of a congestion control method may include steps 501 to 507.

501: Obtain a target TCB corresponding to a target parameter, where the target TCB further includes a second flag bit and a first flag bit.

In this embodiment, after receiving an acknowledgment (ACK) packet, the TOE may determine a target TCP connection to which the ACK packet belongs, and further obtain the target TCB corresponding to the target TCP connection, where the target TCB includes the target parameter, in other words, obtain the target TCB corresponding to the target parameter.

In this embodiment, the target TCB includes the first flag bit, the second flag bit, and the target parameter. After determining, based on the first flag bit, that the CPU needs to participate in congestion control, the TOE may read the second flag bit. If the second flag bit instructs to transfer the target TCB to the CPU, step 502 is performed. If the second flag bit instructs to transfer only the target parameter to the CPU, step 503 is performed.

In this embodiment, when establishing the target TCB, the CPU may set the second flag bit according to a used congestion control algorithm. For example, when the target parameter required by the CPU changes, the CPU may set the second flag bit to instruct to transfer the target TCB to the CPU. For another example, when the CPU needs a relatively small quantity of target parameters, the CPU may set the second flag bit to instruct to transfer the target parameters to the CPU. Specifically, the CPU may flexibly set the second flag bit based on an actual situation.

In this embodiment, two types of hardware logic for implementing the congestion control notification are configured on the TOE, and the forgoing two types of hardware logic may be switched by modifying the second flag bit. This improves implementation flexibility of this solution.

502: The TOE sends a congestion control notification to the CPU, where the congestion control notification includes a fifth message, and the fifth message is used by the CPU to obtain the target TCB.

In this embodiment, step 502 is similar to step 302 in the embodiment in FIG. 3. Details are not described herein again.

503: The TOE sends the congestion control notification to the CPU, where the congestion control notification includes a sixth message, and the sixth message is used by the CPU to obtain only the target parameter.

In this embodiment, step 503 is similar to step 402 in the embodiment in FIG. 4. Details are not described herein again.

504: The CPU generates a congestion control calculation result based on the target parameter.

505: The TOE obtains the congestion control calculation result returned by the CPU.

506: The TOE sends a packet based on the congestion control window value.

507: The TOE executes another program.

In this embodiment, steps 504 to 507 are similar to steps 303 and 306 in the embodiment in FIG. 3. Details are not described herein again.

Figure 6:
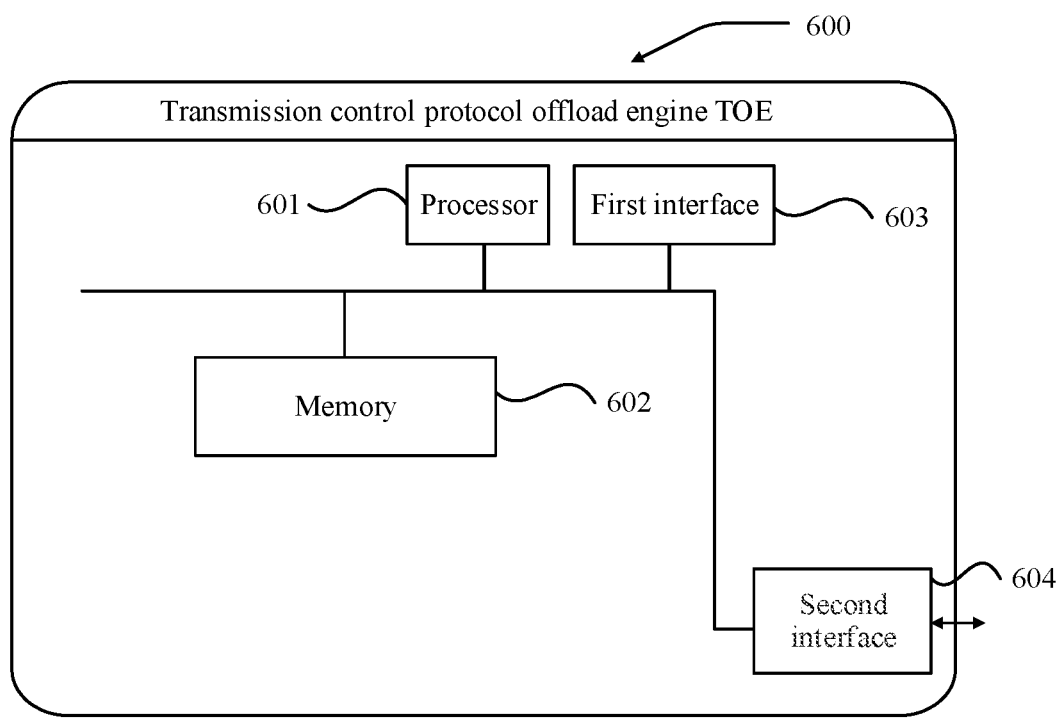
FIG. 6 is a schematic structural diagram of a Transmission Control Protocol offload engine according to an embodiment of this application.

FIG. 6 is a schematic structural diagram of a Transmission Control Protocol offload engine according to an embodiment of this application. The Transmission Control Protocol offload engine TOE 600 may vary greatly with different configurations or performance, and may include one or more processors 601 and a memory 602 (for example, one or more mass storage devices). The memory 602 may be a volatile memory or a non-volatile memory. A program stored in the memory 602 may include one or more modules (not shown in FIG. 6), and each module may include a series of instruction operations. Further, the processor 601 may be configured to communicate with the memory 602, and perform, on the TOE 600, a series of instruction operations that are in the memory 602.

The TOE 600 may further include a first interface 603 and a second interface 604.

In some embodiments of the present invention, the processor 601, the memory 602, the first interface 603, and the second interface 604 are connected to each other. The processor 601 communicates with the CPU by using the first interface 603, and sends a packet by using the second interface 604.

The processor 601 is configured to send a congestion control notification to a central processing unit CPU by using the first interface, where the congestion control notification instructs the CPU to obtain a target parameter, and the target parameter is used by the CPU to generate a congestion control calculation result.

The processor 601 is configured to obtain, by using the first interface 603, the congestion control calculation result returned by the CPU, where the congestion control calculation result includes a congestion control window value.

The memory 602 is configured to store the congestion control window value.

The processor 601 is configured to send a packet by using the second interface 604 based on the congestion control window value stored in the memory.

In this embodiment, a procedure executed by each element in the Transmission Control Protocol offload engine is similar to a procedure executed by the Transmission Control Protocol offload engine in the embodiments shown in FIG. 3 to FIG. 5. Details are not described herein again.

In this embodiment, the Transmission Control Protocol offload engine sends the congestion control notification to the CPU, and receives the congestion control calculation result generated by the CPU based on the congestion control notification, where the congestion control calculation result includes the congestion control window value. The TOE adjusts an actual length of a to-be-sent packet based on the congestion control window value. In this solution, the CPU calculates and generates the congestion control window value, in other words, a congestion control algorithm is run on software. Because the software is quickly updated, when a new congestion control algorithm emerges, the congestion control algorithm can be quickly upgraded. This improves flexibility of updating the congestion control algorithm. In addition, after obtaining the congestion control window value, the hardware TOE adjusts the actual length of the to-be-sent packet. Because a processing speed of the hardware is fast, efficiency of an entire congestion control process is improved.

In a possible implementation, the memory 602 further stores a target TCB corresponding to the target parameter, and the processor 601 is further configured to obtain the target TCB. The target TCB includes a parameter generated in a process of receiving and sending packets, and the target TCB includes a first flag bit. When the first flag bit indicates that the CPU needs to participate in congestion control, the processor 601 sends the congestion control notification to the CPU by using the first interface 603.

For the congestion control notification, refer to the description in the method embodiment.

The processor 601 may execute functions of a receiving engine 1001 and a congestion control engine 1002. The first interface may include a command processing engine 1004. The second interface may include a sending engine 1005.

An embodiment of this application further provides a congestion control system. The system includes a Transmission Control Protocol offload engine TOE and a central processing unit CPU.

The TOE is configured to send a congestion control notification to the CPU, obtain a congestion control calculation result returned by the CPU based on the congestion control notification, and send a packet based on a congestion control window value included in the congestion control result. The congestion control notification instructs the CPU to obtain a target parameter, and the target parameter is used by the CPU to generate the congestion control calculation result.

The CPU is configured to: receive the congestion control notification sent by the TOE, obtain the target parameter based on the congestion control notification, generate the congestion control calculation result based on the target parameter, and send the congestion control calculation result to the TOE. The congestion control calculation result includes the congestion control window value, and the congestion control window value is used by the TOE to send a packet.

In this embodiment, a procedure executed by each element in the Transmission Control Protocol offload engine is similar to a procedure executed by the Transmission Control Protocol offload engine in the embodiments shown in FIG. 3 to FIG. 5. Details are not described herein again.

In a possible implementation, the TOE is further configured to obtain a target transmission control block TCB corresponding to the target parameter. The target TCB includes a parameter generated in a process of receiving and sending packets, and the target TCB includes a first flag bit. The TOE sends the congestion control notification to the CPU when the first flag bit indicates that the CPU needs to participate in congestion control.

An embodiment of this application further provides a computer storage medium. The computer-readable storage medium stores a congestion control instruction. When the instruction is run on a computer, the computer is enabled to perform the methods described in the embodiments shown in FIG. 3 to FIG. 5.

An embodiment of this application further provides a computer program product including a congestion control instruction. When the computer program product runs on a computer, the computer is enabled to perform the methods described in the embodiments shown in FIG. 3 to FIG. 5.

An embodiment of this application further provides a chip system. The chip system includes a processor, configured to support a network device in implementing functions in the foregoing aspects, for example, sending or processing data and/or information in the foregoing methods. In a possible design, the chip system further includes a memory, where the memory is configured to store a program instruction and data that are necessary for a network device. The chip system may include a chip, or may include a chip and another discrete component.

In the embodiments provided in this application, it should be understood that the disclosed apparatus, computer storage medium, and computer program product may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A congestion control method, comprising:
    obtaining, by a Transmission Control Protocol offload engine (TOE), a target transmission control block (TCB) corresponding to a target parameter, the target TCB including a first flag bit;
    sending, by the TOE, a congestion control notification to a central processing unit (CPU) based on the first flag bit indicating that the CPU needs to participate in congestion control, wherein
        the congestion control notification instructs the CPU to obtain the target parameter, and
        the CPU uses the target parameter to generate a congestion control calculation result;
    obtaining, by the TOE, the congestion control calculation result returned by the CPU, wherein
        the congestion control calculation result comprises a congestion control window value; and
    sending, by the TOE, a packet based on the congestion control window value.

2. The method according to claim 1, wherein
    the target TCB comprises a parameter generated in a process of receiving and sending packets.

3. The method according to claim 1, wherein sending the congestion control notification to the CPU comprises:
    sending, by the TOE, a first message to the CPU, wherein
        the first message is used to instruct the CPU to perform congestion control calculation,
        the first message comprises a first initial address of storage space of the target TCB, and
        the first initial address is used by the CPU to read the target TCB, to obtain the target parameter comprised in the target TCB.

4. The method according to claim 1, wherein sending the congestion control notification to the CPU comprises:
    sending, by the TOE, a second message to the CPU, wherein
        the second message is used to instruct the CPU to perform congestion control calculation,
        the second message carries the target TCB, and
        the target TCB comprises the target parameter, wherein the CPU obtains the target parameter from the target TCB carried in the second message.

5. The method according to claim 1, wherein sending the congestion control notification to the CPU comprises:
    sending, by the TOE, a third message to the CPU, wherein
        the third message is used to instruct the CPU to perform congestion control calculation,
        the third message comprises a second initial address of storage space of the target parameter, and
        the second initial address is used by the CPU to obtain the target parameter.

6. The method according to claim 1, wherein the target TCB further comprises a second flag bit and the target parameter;
    if the second flag bit instructs to transfer the target TCB to the CPU, the congestion control notification comprises a fifth message, and the fifth message is used by the CPU to obtain the target TCB and extract the target parameter from the target TCB; and
    if the second flag bit instructs to transfer only the target parameter to the CPU, the congestion control notification comprises a sixth message, and the sixth message is used by the CPU to obtain only the target parameter.

7. The method according to claim 1, wherein obtaining the congestion control calculation result returned by the CPU comprises:
    receiving, by the TOE, a seventh message returned by the CPU, wherein the seventh message carries the congestion control calculation result; or
    receiving, by the TOE, a ninth message returned by the CPU, wherein the ninth message comprises a third initial address of a storage location of the congestion control calculation result, and reading, by the TOE, the congestion control calculation result by using the third initial address as a start location.

8. The method according to claim 1, wherein obtaining the congestion control calculation result returned by the CPU comprises:
    receiving, by the TOE, an eighth message returned by the CPU, wherein the eighth message is used to indicate that the congestion control calculation result has been written by the CPU into the target TCB, and reading, by the TOE, the congestion control calculation result from the target TCB.

9. A Transmission Control Protocol offload engine (TOE), comprising:
a processor;
a memory;
a first interface; and
a second interface, wherein
the processor is configured to:
send a congestion control notification to a central processing unit (CPU) by using the first interface, wherein
the congestion control notification instructs the CPU to obtain a target parameter, and
the target parameter is used by the CPU to generate a congestion control calculation result; and
obtain, by using the first interface, the congestion control calculation result returned by the CPU, wherein
the congestion control calculation result comprises a congestion control window value;
the memory is configured to store the congestion control window value; and
the processor is further configured to send a packet by using the second interface based on the congestion control window value stored in the memory.

10. The TOE according to claim 9, wherein
the processor is further configured to obtain a target transmission control block (TCB) corresponding to the target parameter, wherein the target TCB comprises a parameter generated in a process of receiving and sending packets, and the target TCB comprises a first flag bit; and
when the first flag bit indicates that the CPU needs to participate in congestion control, the processor sends the congestion control notification to the CPU by using the first interface.

11. The TOE according to claim 10, wherein
the congestion control notification comprises a first message,
the first message comprises a first initial address of storage space of the target TCB, and
the first initial address is used by the CPU to read the target TCB, to obtain the target parameter comprised in the target TCB.

12. The TOE according to claim 10, wherein
the congestion control notification comprises a second message,
the second message carries the target TCB, and
the target TCB comprises the target parameter, wherein the CPU obtains the target parameter from the target TCB carried in the second message.

13. The TOE according to claim 10, wherein
the congestion control notification comprises a third message,
the third message comprises a second initial address of storage space of the target parameter, and
the second initial address is used by the CPU to obtain the target parameter.

14. The TOE according to claim 10, wherein the target TCB further comprises a second flag bit and the target parameter, wherein
if the second flag bit instructs to transfer only the target parameter to the CPU, the congestion control notification comprises a fifth message, and the fifth message is used by the CPU to obtain the target parameter; and if the second flag bit instructs to transfer the target TCB to the CPU, the congestion control notification comprises a sixth message, and the sixth message is used by the CPU to obtain the target TCB and extract the target parameter from the target TCB.

15. The TOE according to claim 9, wherein
the processor is further configured to:
receive, by using the first interface, a seventh message returned by the CPU, wherein the seventh message carries the congestion control calculation result; or
receive, by using the first interface, a ninth message returned by the CPU, wherein the ninth message comprises a third initial address of a storage location of the congestion control calculation result, and
read the congestion control calculation result by using the third initial address as a start location.

16. The TOE according to claim 10, wherein the processor is configured to:
receive, by using the first interface, an eighth message returned by the CPU, wherein the eighth message is used to indicate that the congestion control calculation result has been written by the CPU into the target TCB, and
read the congestion control calculation result from the target TCB.

17. A congestion control system, comprising:
a Transmission Control Protocol offload engine (TOE); and
a central processing unit (CPU), wherein
the TOE is configured to:
send a congestion control notification to the CPU,
obtain a congestion control calculation result returned by the CPU based on the congestion control notification, and
send a packet based on a congestion control window value comprised in the congestion control result, wherein
the congestion control notification instructs the CPU to obtain a target parameter, and
the target parameter is used by the CPU to generate the congestion control calculation result; and
the CPU is configured to:
receive the congestion control notification sent by the TOE,
obtain the target parameter based on the congestion control notification,
generate the congestion control calculation result based on the target parameter, and
send the congestion control calculation result to the TOE, wherein
the congestion control calculation result comprises the congestion control window value, and
the congestion control window value is used by the TOE to send the packet.

18. The system according to claim 17, wherein the TOE is further configured to:
obtain a target transmission control block TCB corresponding to the target parameter, wherein
the target TCB comprises a parameter generated in a process of receiving and sending packets, and
the target TCB comprises a first flag bit; and
send the congestion control notification to the CPU when the first flag bit indicates that the CPU needs to participate in congestion control.

19. The TOE according to claim 9, wherein the processor is further configured to:

compare a length of a to-be-sent packet with the congestion control window value; and adjust a payload length of the to-be-sent packet when the length of the to-be-sent packet is greater than the congestion control window value.

20. The TOE according to claim 9, wherein when the congestion control calculation result further includes a packet sending rate, the processor is further configured to adjust, based on the packet sending rate, a time interval of sending two adjacent packets.

* * * * *